United States Patent
Yang et al.

(10) Patent No.: US 12,165,067 B2
(45) Date of Patent: Dec. 10, 2024

(54) ANOMALY AUGMENTED GENERATIVE ADVERSARIAL NETWORK

(71) Applicants: The Board of Trustees of the Leland Stanford Junior University, Stanford, CA (US); Ford Global Technologies, LLC, Dearborn, MI (US)

(72) Inventors: Ziyi Yang, Bellevue, WA (US); Eric Felix Darve, Foster City, CA (US); Iman Soltani Bozchalooi, Sacramento, CA (US)

(73) Assignees: The Board of Trustees of the Leland Stanford Junior University, Stanford, CA (US); Ford Global Technologies, LLC, Dearborn, MI (US)

( * ) Notice: Subject to any disclaimer, the term of this patent is extended or adjusted under 35 U.S.C. 154(b) by 943 days.

(21) Appl. No.: 16/912,555

(22) Filed: Jun. 25, 2020

(65) Prior Publication Data
US 2020/0410285 A1      Dec. 31, 2020

Related U.S. Application Data

(60) Provisional application No. 62/866,559, filed on Jun. 25, 2019.

(51) Int. Cl.
*G06N 3/084* (2023.01)
*G06F 18/214* (2023.01)
(Continued)

(52) U.S. Cl.
CPC ......... *G06N 3/084* (2013.01); *G06F 18/2148* (2023.01); *G06N 3/045* (2023.01);
(Continued)

(58) Field of Classification Search
CPC .............................. G06N 3/045; G06N 3/088
See application file for complete search history.

(56) References Cited

PUBLICATIONS

Xiong, L., Póczos, B., Schneider, J., Connolly, A., & VanderPlas, J. (Jun. 2011). Hierarchical probabilistic models for group anomaly detection. In Proceedings of the fourteenth international conference on artificial intelligence and statistics (pp. 789-797). JMLR Workshop and Conference Proceedings. (Year: 2011).*

(Continued)

*Primary Examiner* — Kamran Afshar
*Assistant Examiner* — Lokesha G Patel
(74) *Attorney, Agent, or Firm* — KPPB LLP

(57) ABSTRACT

Systems and methods for anomaly detection in accordance with embodiments of the invention are illustrated. One embodiment includes a method for training a system for detecting anomalous samples. The method draws data samples from a data distribution of true samples and an anomaly distribution and draws a latent sample from a latent space. The method further includes steps for training a generator to generate data samples based on the drawn data samples and the latent sample, and training a cyclic discriminator to distinguish between true data samples and reconstructed samples. A reconstructed sample is generated by the generator based on an encoding of a data sample. The method identifies a set of one or more true pairs, a set of one or more anomalous pairs, and a set of one or more generated pairs. The method trains a joint discriminator to distinguish true pairs from anomalous and generated pairs.

16 Claims, 6 Drawing Sheets

(51) Int. Cl.
   G06N 3/045     (2023.01)
   G06N 3/088     (2023.01)
   G06V 10/764    (2022.01)
   G06V 10/774    (2022.01)
   G06V 10/82     (2022.01)

(52) U.S. Cl.
   CPC .......... *G06N 3/088* (2013.01); *G06V 10/764* (2022.01); *G06V 10/7747* (2022.01); *G06V 10/82* (2022.01)

(56) References Cited

PUBLICATIONS

Zenati, H., Romain, M., Foo, C. S., Lecouat, B., & Chandrasekhar, V. (Nov. 2018). Adversarially learned anomaly detection. In 2018 https://arxiv.org/abs/1812.02288. (Year: 2018).*
Phuc Ngo, C., Aristo Winarto, A., Kou Khor Li, C., Park, S., Akram, F., & Lee, H. K. (2019). Fence GAN: Towards Better Anomaly Detection. arXiv e-prints, arXiv-1904. (Year: 2019).*
Aggarwal et al., "On the Surprising Behavior of Distance Metrics in High Dimensional Space," International Conference on Database Theory, 2001, pp. 420-434.
An et al., "Variational Autoencoder based Anomaly Detection using Reconstruction Probability," SNU Data Mining Center, 2015-2 Special Lecture on IE, Dec. 27, 2015, 18 pgs.
Buczak et al., "A Survey of Data Mining and Machine Learning Methods for Cyber Security Intrusion Detection," IEEE Communications Surveys & Tutorials, vol. 18, No. 2, Second quarter 2016, pp. 1153-1176, DOI: 10.1109/COMST.2015.2494502.
Donahue et al., "Adversarial Feature Learning," arXiv: 1605.09782v1 [cs.LG], May 31, 2016, 11 pgs.
Dua et al., "UCI machine learning repository," UC Irvine Machine Learning Repository, Retrieved from: http://archive.ics.uci.edu/ml/index.php on Dec. 23, 2017, 2 pgs.
Dumoulin et al., "Adversarially Learned Inference," arXiv:1606.00704v1 [stat.ML], Jun. 2, 2016, 16 pgs.
Golan et al., "Deep Anomaly Detection Using Geometric Transformations," Proceedings of the 32nd International Conference on Neural Information Processing Systems, Montreal, Canada, Dec. 3-8, 2018, 12 pgs.
Goodfellow et al., "Generative Adversarial Nets," Advances in Neural Information Processing Systems, vol. 27, 2014, 9 pgs.
Li et al., "ALICE: Towards Understanding Adversarial Learning for Joint Distribution Matching," Proceedings of the 31st Conference on Neural Information Processing Systems, Long Beach, California, Dec. 4-9, 2017, 9 pgs.
Liu et al., F.T., "Isolation Forests," 2008 Eighth IEEE International Conference on Data Mining, Dec. 15-19, 2008, Pisa, Italy, pp. 413-422, DOI: 10.1109/ICDM.2008.17.
Ngiam et al., "Multimodal Deep Learning," Proceedings of the 28th International Conference on Machine Learning, Bellevue, Washington, Jun. 28-Jul. 2, 2011, 8 pgs.
Nguyen et al., "Anomaly Detection With Multiple-Hypotheses Predictions," arXiv: 1810.13292v4 [cs.CV], Jan. 28, 2019, 17 pgs.
Park et al., "Multimodal Execution Monitoring for Anomaly Detection During Robot Manipulation," Proceedings of the IEEE International Conference on Robotics and Automation, Stockholm, Sweden, May 16-21, 2016, 8 pgs.
Radford et al., "Unsupervised Representation Learning with Deep Convolutional Generative Adversarial Networks," arXiv:1511.06434v1 [cs.LG], Nov. 19, 2015, 15 pgs.
Ruff et al., "Deep One-Class Classification," Proceedings of the 35th International Conference on Machine Learning, Stockholm, Sweden, Jul. 10-15, 2018, 10 pgs.
Schlegl et al., "Unsupervised Anomaly Detection with Generative Adversarial Networks to Guide Marker Discovery," International Conference on Information Processing in Medical Imaging, vol. 10265, May 23, 2017, pp. 146-157, DOI: 10.1007/978-3-319-59050-9 12.
Schölkopf et al., "Support Vector Method for Novelty Detection," Proceedings of the 12th International Conference on Neural Information Processing Systems, Denver, Colorado, Nov. 29-Dec. 4, 1999, pp. 582-588.
Zenati et al., "Adversarially Learned Anomaly Detection," Proceedings of the IEEE International Conference on Data Mining, Singapore, Singapore, Nov. 17-20, 2018, pp. 727-736, Doi: 10.1109/ICDM.2018.00088.
Zhai et al., "Deep Structured Energy Based Models for Anomaly Detection," arXiv:1605.07717v1 [cs.LG], May 25, 2016, 10 pgs.
Zong et al., "Deep Autoencoding Gaussian Mixture Model for Unsupervised Anomaly Detection," ICLR 2018 Conference Blind Submission, Feb. 15, 2018, 19 pgs.
Salimans et al., "Improved Techniques for Training GANs", Advances in Neural Information Processing Systems, pp. 2234-2242, (2016).

* cited by examiner

ANOMALY AUGMENTED GENERATIVE ADVERSARIAL NETWORK

CROSS-REFERENCE TO RELATED APPLICATIONS

The current application claims the benefit of and priority under 35 U.S.C. § 119(e) to U.S. Provisional Patent Application No. 62/866,559 entitled "Anomaly Augmented Generative Adversarial Network" filed Jun. 25, 2019. The disclosure of U.S. Provisional Patent Application No. 62/866,559 is hereby incorporated by reference in its entirety for all purposes.

FIELD OF THE INVENTION

The present invention generally relates to anomaly detection and, more specifically, to training generative models for anomaly detection.

BACKGROUND

Anomaly detection refers to the task of identifying anomalous observations that deviate from what are believed to be normal data. It has been an important and active research area in many domains, such as medical diagnosis, intrusion detection, and robotics. Emerging deep learning models with extraordinary capacity to estimate the complex distributions in real-world data provide new approaches for anomaly detection. Efforts have been made to address anomaly detection by deep neural network, for example energy-based models and deep Gaussian mixture models.

Also known as novelty detection and outlier detection, anomaly detection has been extensively studied. Previous work can be roughly categorized into two types, representation learning and generative model. Representation learning methods address anomaly detection by extracting common features or learning a data mapping from normal data. Generative models mostly try to learn the reconstruction of data and detect anomaly through reconstruction profiles.

SUMMARY OF THE INVENTION

Systems and methods for anomaly detection in accordance with embodiments of the invention are illustrated. One embodiment includes a method for training a system for detecting anomalous samples. The method includes steps for drawing data samples from a data distribution of true samples and an anomaly distribution and drawing a latent sample from a latent space. The method further includes steps for training a generator to generate data samples based on the drawn data samples and the latent sample, training an encoder to generate encodings of data samples, and training a cyclic discriminator to distinguish between true data samples and reconstructed samples. A reconstructed sample is generated by the generator based on an encoding of a data sample. The method includes a step for identifying a set of one or more true pairs, a set of one or more anomalous pairs, and a set of one or more generated pairs. Each true pair includes a true sample and an encoding of the true sample, each anomalous pair includes an anomalous sample and an encoding of the anomalous sample, and each generate pair includes a sample generated from a latent sample and the latent sample. The method trains a joint discriminator to distinguish true pairs from anomalous and generated pairs. The generator and encoder are further trained based on the cyclic and joint discriminators.

In a further embodiment, the anomaly distribution is a surrogate anomaly distribution.

In still another embodiment, the surrogate anomaly distribution is a Gaussian distribution.

In a still further embodiment, drawing a sample from the anomaly distribution includes drawing samples from a known set of anomalous data samples.

In yet another embodiment, the latent space is a random noise distribution.

In a yet further embodiment, the training the generator comprises generating a data sample from the drawn latent sample and generating encodings of the true and anomalous data samples. Training the generator further comprises computing a loss by passing the true data sample and the corresponding generated encoding through the discriminator, passing the anomalous data sample and the corresponding generated encoding through the discriminator, and passing the generated data sample and the drawn latent sample through the discriminator. Training the generator further comprises backpropagating the computed loss through the generator.

In another additional embodiment, the method further includes steps for receiving a data sample, generating a reconstructed data sample from the received data sample using the generator, and computing an anomaly score for a sample pair using the discriminator. The sample pair includes the received data sample and the reconstructed data sample.

An embodiment includes a method for detecting anomalous samples. The method includes steps for receiving a data sample, generating a reconstructed data sample from the received data sample using a generator parameterized to generate data samples according to a true distribution, and computing an anomaly score for a sample pair includes the received data sample and the reconstructed data sample, wherein computing the anomaly score includes using a discriminator parameterized to determine a probability that the sample pair includes a pair of samples from the true distribution.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
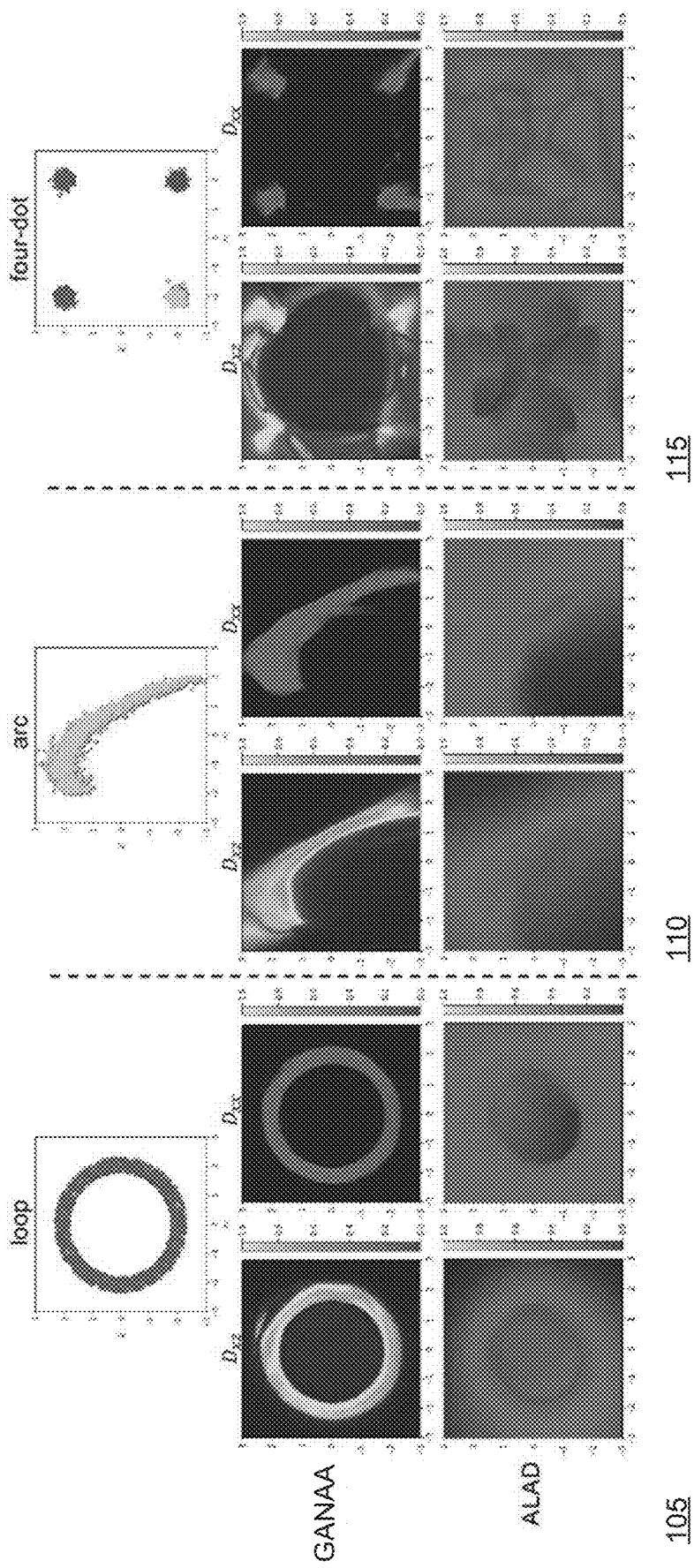
FIG. 1 illustrates examples of synthetic dataset results of an anomaly detection process in accordance with an embodiment of the invention.

Systems and methods in accordance with some embodiments of the invention provide methods for anomaly detection. Previous anomaly detection methods focus on modelling the distribution of normal data provided during training. However, this does not necessarily ensure the correct detection of anomalous data (false positives). Systems and methods in accordance with numerous embodiments of the invention implement anomaly augmented generative adversarial network (AAGAN), in which deep neural networks can be adversarially trained to better recognize samples from an anomaly distribution. Although many of the examples described herein perform anomaly detection in the context of GANs, one skilled in the art will recognize that similar systems and methods can be used in a variety of applications with other generative models, including (but not limited to) variational autoencoders, Gaussian mixture models, and Boltzmann machines without departing from this invention.

In various embodiments, AAGAN can use a novel loss function and framework. Processes in accordance with a variety of embodiments of the invention can provide stronger guarantees for detecting anomalous examples compared to the current state-of-the-art. Experimental results on both real-world and synthetic data show that models in accordance with numerous embodiments of the invention can lead to significant and consistent improvements on previous anomaly detection benchmarks.

The anomaly detection problem can be formulated as follows. Define a normal data distribution $q(x)$, such that $x \sim q(x)$ are considered as normal data ("normal" does not refer to Gaussian distribution in this description unless mentioned). In unsupervised anomaly detection, only normal data samples are used during training. The goal is to learn an anomaly score function $A(x)$ from training normal examples such that anomalous examples are assigned with larger anomaly scores than normal examples.

One approach for anomaly detection is to model the underlying distribution of normal data $q(x)$ based on training normal examples. As one of the most promising deep generative models, Generative Adversarial Networks (GANs) can model a distribution by a transformation from a latent space distribution $p(z)$ and the transformation can also be considered as a conditional distribution $p(x|z)p(z)$. This conditional distribution is specified by a generator network $G(z)$ such that the generator distribution $p(x)=\int p(x|z)p(z)dz$. The GAN framework also trains a discriminator network $D(x)$ to distinguish between real data from $q(x)$ and synthetic data generated from $p(x)$. The minmax objective function for GAN is:

$$\min_{G} \max_{D} V(D, G) = \mathbb{E}_{x \sim q(x)}[\log D(x)] + \mathbb{E}_{z \sim p(z)}[\log(1 - D(G(z)))] \quad (1)$$

The optimal generator and discriminator correspond to a saddle point in Eq. 1 such that the generator distribution matches the data distribution $p(x)=q(x)$.

In various embodiments, AAGAN provides a bi-directional Generative Adversarial Network (GAN) that can allow for high-quality mapping back from data to latent variable space via an encoder network. This efficient latent space inference makes bi-directional GAN a suitable tool for anomaly detection. While other methods implement bi-directional Generative Adversarial Networks to leverage reconstruction of data from GAN for anomaly criterion, most of the previous work focuses on density estimation based primarily on normal data. A theoretical understanding on how and why generative models can detect anomaly is still lacking.

Adversarially Learned Inference (ALI), a bi-directional GAN introduces an encoder network $E(x)$ and attempts to match the encoder joint distribution $q(x,z)=q(x)e(z|x)$ and the generator joint distribution $p(x,z)=p(z)p(x|z)$, where $e(z|x)$ is parameterized by the encoder network. The optimization objective for ALI is defined as:

$$\min_{E,G} \max_{D_{xz}} V_{ALI}(D_{xz}, G, E) = \quad (2)$$
$$\mathbb{E}_{x \sim q(x)}[\log D_{xz}(x, E(x))] + \mathbb{E}_{z \sim p(z)}[\log(1 - D_{xz}(G(z), z))]$$

where $D_{xz}$ is a discriminator network that takes both x and z as input and the output is the probability that x and z are from $q(x,z)$. It follows that the optimum of the encoder, generator and discriminator is a saddle point of Eq. 2 if and only if $q(x,z)=p(x,z)$. And if a solution of Eq. 2 is achieved, the marginal and joint distributions in $\{x,z\}$ match.

ALI with Conditional Entropy (ALICE) adds a second discriminator $D_{xx}$ network to ALI to distinguish x and its reconstruction $\hat{x}=G(E(x))$. An extra term is included in the overall optimization objective, written as:

$$\min_{E,G} \max_{D_{xz},D_{xx}} V_{ALICE} = \quad (3)$$
$$V_{ALI} + \mathbb{E}_{x \sim q(x)}[\log D_{xx}(x, x) + \log(1 - D_{xx}(x, \hat{x}))]$$

ALICE approximates an upper bound of the conditional entropy $H^\pi(x|z) = -\mathbb{E}_{\pi(x,z)}[\log \pi(x|z)]$, where $\pi(x,z)$ represents the matched joint distribution $$\pi(x, z) \triangleq q(x, z) = p(x, z).$$

It follows that that the corresponding optimal generator and encoder theoretically guarantees a perfect reconstruction for $x \sim q(x)$.

Adversarially Learned Anomaly Detection (ALAD) utilizes a bi-directional GAN for anomaly detection. ALAD trains an ALICE framework on normal data, where they add an extra discriminator $D_{zz}$ to encourage cycle consistency in the latent space. The anomaly score $A(x)$ depends on how well x can be reconstructed.

However, one important point has been overlooked in previous generative based anomaly detection approaches. Although these generative models have the ability to reconstruct normal samples and assign low anomaly score to normal data, there is no guarantee on the detection of anomalous samples. To be more specific, the generative model does not necessarily yield poor reconstruction and high anomaly scores for anomalous samples. Especially for previous GAN-based models, it is not guaranteed that the discriminator, trained to distinguish between $x \sim p(x)$ and its reconstruction, can successfully discriminate between normal and abnormal data.

In certain embodiments, processes can implement AAGAN with special modifications to the loss function and discriminator networks to recognize anomaly distribution. Since anomalous samples are not available during training in unsupervised anomaly detection, processes in accordance with some embodiments of the invention use a surrogate anomaly distribution a(x) with regards to the normal data distribution q(x) in the adversarial training, such that discriminator is trained adversarially to identify surrogate anomalous samples from a(x). In a number of embodiments, the surrogate anomaly distribution is chosen to be a random noise distribution (e.g., Gaussian distribution, uniform distribution, etc.). Mathematical proofs show that the introduction of surrogate anomaly distribution ensures a poor reconstruction on anomalous data and provides a guarantee on the anomaly detection.

In some embodiments, prior knowledge about the anomaly distribution, e.g., anomalous samples, may be available. In medical diagnosis, for instance, anomalous (unhealthy) data are usually known from historical observations. Exploiting these real anomalous examples can lead to more accurate anomaly detection. In several embodiments, practical anomalous examples can be utilized by regarding them as samples from a(x) during adversarial training.

In a number of embodiments, bringing in real anomalous data on top of random noise to augment the anomalous distribution a(x) can yield better anomaly detection, compared with using random noise as a(x) only. However, using only anomalous data as a(x), can produce worse performance compared with using random noise. This result again shows that introducing random noise x' improves the accuracy of the discriminator for anomaly detection.

In several embodiments, surrogate anomaly distributions a(x) can be applied during adversarial training. Systems and methods in accordance with many embodiments of the invention can include an anomaly augmentation term $\mathbb{E}_{x \sim a(x)} \log(1 - D_{xz}(x, E(x)))$ that accounts for samples drawn from an anomaly distribution. The objective function in accordance with certain embodiments of the invention becomes:

$$\min_{E,G} \max_{D_{xz}} V(D_{xz}, G, E) = \mathbb{E}_{x \sim q(x)}[\log D_{xz}(x, E(x))] + \quad (4)$$
$$\mathbb{E}_{z \sim p(z)}[\log(1 - D_{xz}(G(z), z))] + \mathbb{E}_{x \sim a(x)}[\log(1 - D_{xz}(x, E(x)))]$$

In numerous embodiments, a surrogate anomaly distribution a(x) can be a random distribution, e.g., Gaussian distribution. The use of such a distribution is valid in high dimensional space $\mathbb{R}^d$ since for two random points $v, w \sim [-1,1]^d$, the Euclidean distance $\|v-w\|_2 \to \infty$ when $d \to \infty$. Normal data tends to cluster in the space since they share similar properties. As such, a sample x drawn from a random distribution should be adequately distant from the normal data cluster with $q(x) \to 0$. Therefore, x can be considered as anomalous against normal data. For example, a picture with pixels sampled from a random distribution is unlikely to compose anything meaningful.

At the optimal point, a discriminator $D_{xz}$ in accordance with many embodiments of the invention will assign a low score to anomaly samples $x \sim a(x)$. In numerous embodiments, discriminator $D_{xz}$ is a discriminator network that takes both a sample x and a corresponding latent variable (e.g., an encoding of x) z as input, where the output is the probability that x and z are from the "normal" joint distribution q(x,z). In principle, generators G in accordance with a number of embodiments of the invention only map latent variables z to normal samples. However, in practice, G often maps a few z to abnormal samples. This leads to false positive detection (that is abnormal samples recognized as normal by the algorithm). By adding the anomaly augmentation term in Eq. 4, the generator G is pushed to create normal samples in a more robust and reliable way. As a result, regardless of the encoding E(x), a reconstruction of an anomalous $x_a$ (i.e., $G(E(x_a))$), will be close to the normal sample distribution. Consequently, a reconstruction of an anomalous sample $G(E(x_a))$ will be far from the anomalous sample $x_a$.

The optimal discriminator and generator distribution can successfully distinguish abnormal from normal data. The optimal discriminator will be derived below and then the corresponding optimal generator. Consider the following joint distributions:

the encoder joint distribution on normal data q(x,z)=q(x)e(z|x).
the encoder joint distribution on anomalous data a(x,z)=a(x)e(z|x).
the generator joint distribution p(x,z)=p(z)p(x|z).

where conditional distributions p(x|z) and e(z|x) are specified by the generator and the encoder network respectively. Recall that marginal distributions q(x), a(x) and p(x) correspond to normal data distribution, surrogate anomaly distribution and latent variable distribution.

For fixed generator G and encoder E, the optimal discriminator $D_{xz}^*$ is given by:

$$D_{xz}^* = \frac{q(x,z)}{q(x,z) + a(x,z) + p(x,z)} = \frac{q(x,z)}{\left(1 + \frac{a(x)}{q(x)}\right)q(x,z) + p(x,z)} \quad (5)$$

This optimal discriminator considers both a normal data distribution and an anomaly distribution. Notice that in the case $a(x) \to 0$, i.e., data x is not anomalous, $D_{xz}^*$ degrades to $$\frac{q(x,z)}{q(x,z) + p(x,z)},$$

which is the same solution as the one in classic bi-directional GAN. If $q(x) \to 0$, $a(x) \to 1$, i.e., x is anomalous, then we have $D_{xz}^* \to 0$. This analysis shows that, unlike classic GANs trained only on normal data, optimal discriminators in accordance with a variety of embodiments of the invention are guaranteed to distinguish anomalous from normal data $x \sim q(x)$.

For the optimal generator distribution, substitute Eq. 5 back to Eq. 4 and let s(x,z)=q(x,z)+a(x,z)+p(x,z) and C(E, G)=V($D_{xz}^*$,G,E) for shorthand, it follows that:

$$C(E, G) = 2 \int_{x,z} \frac{a(x,z) + p(x,z)}{2} \log \frac{\frac{1}{2}(a(x,z) + p(x,z))}{\frac{1}{3}s(x,z)} + \quad (6)$$
$$\int_{x,z} q(x,z) \log \frac{q(x,z)}{\frac{1}{3}s(x,z)} + 2\log 2 - 3\log 3$$
$$= 2D_{KL}\left(\frac{1}{2}(a(x,z) + p(x,z)) \| \frac{1}{3}s(x,z)\right) +$$

-continued $$D_{KL}\left(q(x,z)\|\frac{1}{3}s(x,z)\right)-\log\frac{27}{4}$$

where $D_{KL}$ denotes Kullback-Leibler divergence.

Given any encoder, the optimal generator distribution $p(x,z)$ in Eq. 6 is achieved at $p(x_i,z_j)=\max(0,\beta q(x_i,z_j)-a(x_i,z_j))$, where $$\beta = \frac{1+\Sigma_{(m,n)\in S_\beta} a(x_m,z_n)}{\Sigma_{(m,n)\in S_\beta} q(x_m,z_n)} \quad (7)$$

with $S_\beta=\{(m,n)|\beta q(x_i,z_j)-a(x_i,z_j)\geq 0\}$. Eq. 7 has a unique solution (note that $\beta$ shows up on both sides of Eq. 7), and $1\leq\beta\leq 2$. Moreover, $\beta=1$ whenever $qa=0$ everywhere (i.e., q and a do not overlap), and $\beta=2$ whenever $2q-a\geq 0$ everywhere (e.g., $q=a$).

Since $\beta q(x_i,z_j)-a(x_i,z_j)=(\beta q(x_i)-a(x_i))e(z_j|x_i)$, this theorem indicates that the optimal generator maps the latent variable z to x for which the normal data probability $q(x)$ is high and the abnormal probability $a(x)$ is low. This property ensures that $x\sim a(x)$ has a poor reconstruction. Specifically, consider an anomalous sample $x\sim a(x)$ and its encoded latent variable $z=E(x)$. The generator will map z to $G(z)$ such that $a(G(z))$ is small, which leads to a poor reconstruction of x.

To further guarantee a good reconstruction for normal data $x\sim q(x)$, systems and methods in accordance with numerous embodiments of the invention include a second discriminator $D_{xx}$ to enforce cycle-consistency of x and its reconstruction. A discriminator $D_{xx}$ in accordance with some embodiments of the invention takes two samples (e.g., a sample and a reconstructed sample) as input and outputs the probability that both samples are from the normal distribution. The cycle-consistency optimization objective function is defined as:

$$\min_{E,G} \max_{D_{xx}} V_{cycle}(D_{xx},G,E) = \quad (8)$$
$$\mathbb{E}_{x\sim q(x)}\log D_{xx}(x,x)+\mathbb{E}_{x\sim q(x)}\log(1-D_{xx}(x,\tilde{x}))$$

where $\tilde{x}=G(E(x))$ is the reconstruction of x. The optimal generator and encoder of the objective in Eq. 8 leads to $\mathbb{E}_{e(z|x)}p(\tilde{x}|z)=\delta(x-\tilde{x})$, resulting in a perfect reconstruction for $x\sim q(x)$ theoretically. The optimal discriminator is $D_{xx}^*(x,\tilde{x})=\delta(x-\tilde{x})$.

In sum, the complete minmax optimization objective of GAN with Anomaly Augmentation (AAGAN) frameworks in accordance with several embodiments of the invention is the sum of Eq. 4 and Eq. 8:

$$\min_{E,G} \max_{D_{xz},D_{xx}} V(D_{xz},G,E)+V_{cycle}(D_{xx},G,E) \quad (9)$$

After the model is trained on normal data from $p(x)$ and anomalous data from $a(x)$ following Eq. 9, at the detection phase, the anomaly score in accordance with certain embodiments of the invention assigned to an example x can be defined as:

$$A(x)=1-D_{xx}(x,G(E(x)))$$

The anomaly score $A(x)$ describes how well the example x is reconstructed, determined by the discriminator $D_{xx}$. Models in accordance with various embodiments of the invention can enforce a large reconstruction error on anomalous data (which is a desirable feature for identification). Meanwhile, the cycle-consistent objective function encourages accurate reconstruction for normal data. This discrepancy endows models in accordance with a variety of embodiments of the invention with the ability to discriminate the abnormal from the normal much more reliably.

Generative frameworks in accordance with a number of embodiments of the invention can utilize samples from random noise distribution as anomalous data during adversarial training and enable discriminators to better recognize anomalies, as suggested by analysis and experimental evaluations. Results on synthetic data also demonstrate that AAGAN yields more faithful discriminators for anomaly than previous GAN-based model ALAD. Examples of processes in accordance with many embodiments of the invention are evaluated on real-world dataset including KDDCUP (network intrusion), Arrhythmia (medical diagnosis), Thyroid (medical diagnosis) and CIFAR-10 (vision). On KDD-CUP, Arrhythmia and Thyroid dataset, AAGAN outperforms all other baseline models, achieving the new state-of-the-art. Frameworks in accordance with some embodiments of the invention can conveniently leverage real anomalous data for supervised learning and produce further improvement in performance.

Discriminators trained in accordance with many embodiments of the invention exhibit superior performance, assigning lower normal probability to anomalous data outside the normal data cluster. Examples of results on synthetic datasets are illustrated in FIG. 1. Results 105-115 are shown for three different datasets, "loop", "arc", and "four-dot". The first row in each set of results shows samples of normal data, and the second and third row show the output probability of discriminators in AAGAN and ALAD respectively. In each dataset, the left column visualizes the output probability of $D_{xz}$, and the right one shows the output from $D_{xx}$. These plots show the clear distinction between normal and abnormal sets in accordance with numerous embodiments of the invention, where results from ALAD's prediction are much fuzzier.

In the "four-dot" case, where normal data resides in discontinuous clusters, the results 115 show that $D_{xz}$ and $D_{xx}$ in accordance with certain embodiments of the invention can still accurately recognize anomalous data between normal data clusters. Random noise from the distribution $a(x)$, serving as anomalous surrogate during the training, can encourage discriminators to assign low probabilities to regions where normal examples are missing.

Processes for Anomaly Detection

Training

Figure 2:
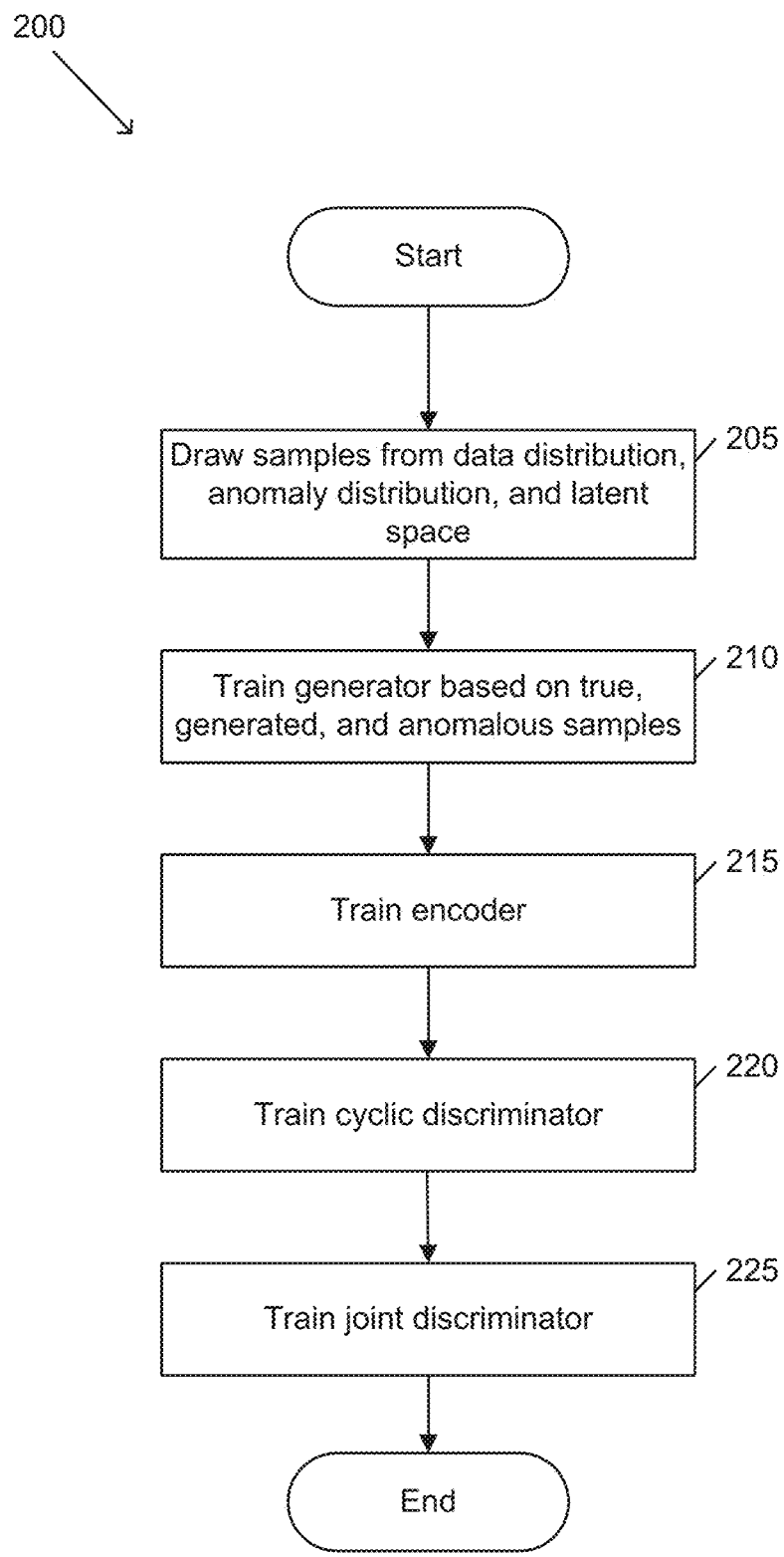
FIG. 2 conceptually illustrates a process for training an anomaly detection system in accordance with an embodiment of the invention.

A process for training an anomaly detection system in accordance with an embodiment of the invention is illustrated in FIG. 2. Process 200 samples (205) from a data distribution, an anomaly distribution, and a latent space. In a variety of embodiments, a set of one or more samples is drawn from each distribution in each pass. Alternatively, or conjunctively, samples can be drawn from different distributions in different training batches. Anomaly distributions in accordance with some embodiments of the invention can include a surrogate anomaly distribution, such as (but not limited to) a Gaussian distribution and/or a uniform distribution. In various embodiments, drawing from an anomaly distribution can include drawing from a true anomaly distribution, e.g., drawing samples that are identified as anomalous. Latent spaces in accordance with a variety of embodiments of the invention can be initialized to random noise.

Process 200 trains (210) a generator based on true samples, generated samples, and anomalous samples. In a variety of embodiments, training a generator includes generating samples from samples of the latent space. Training a generator in accordance with certain embodiments of the invention can include computing a loss using a cyclic discriminator and/or a joint discriminator and backpropagating the loss through the generator. In some embodiments, the loss is based on a cyclic discriminator's ability to distinguish between a true-reconstructed sample pair and a true-true sample pair. The loss in accordance with certain embodiments of the invention is based on a joint discriminator's ability to distinguish between sample-encoding pairs of true samples versus anomalous and/or generated samples. Training generators in accordance with many embodiments of the invention can allow a generator to produce samples within a "normal" distribution, regardless of the input encoding.

Process 200 trains (215) an encoder. Encoders in accordance with some embodiments of the invention can be used to identify features within a latent space for an input sample (e.g., an image). In a number of embodiments, encoders are trained to generate encodings that allow a generator to faithfully reproduce (or reconstruct) a sample from its associated encoding.

Process 200 trains (220) a cyclic discriminator to distinguish between samples and reconstructed samples. Cyclic discriminators in accordance with a number of embodiments of the invention are trained to distinguish between a true-reconstructed sample pair and a true-true sample pair.

Process 200 trains (225) a joint discriminator to distinguish between true sample-encoding pairs and anomalous and/or generated sample-encoding pairs. Joint discriminators in accordance with a number of embodiments of the invention are trained to distinguish between sample-encoding pairs of true samples versus anomalous and/or generated samples.

While specific processes for training an anomaly detection system are described above, any of a variety of processes can be utilized to train such a system as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Anomaly Detection

Figure 3:
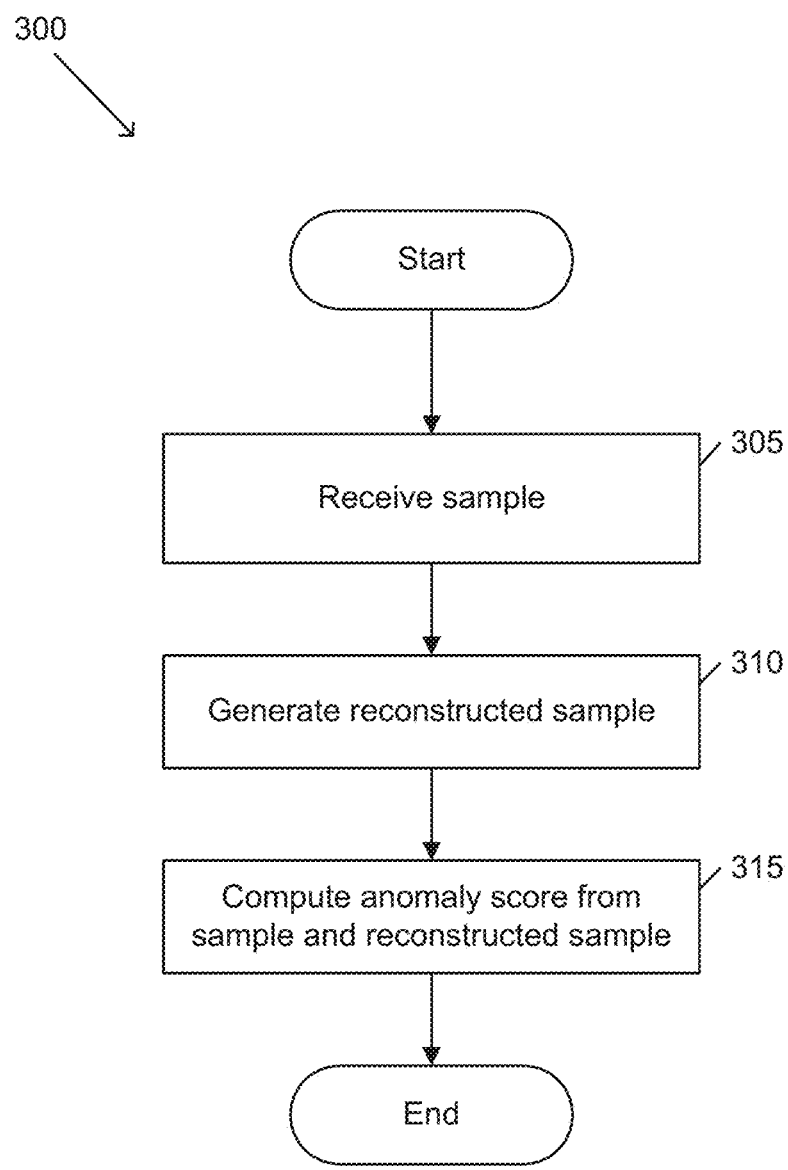
FIG. 3 conceptually illustrates a process for anomaly detection in accordance with an embodiment of the invention.

A process for anomaly detection in accordance with an embodiment of the invention is illustrated in FIG. 3. Process 300 receives (305) a sample. Samples in accordance with some embodiments of the invention can include (but are not limited to) images, system states, network logs, and/or other elements that can be detected as anomalous.

Process 300 generates (310) a reconstructed sample. Reconstructed samples in accordance with many embodiments of the invention can be generated by encoding the received sample and generating the reconstructed sample from the encoding. In a variety of embodiments, generating the encoding can be performed using a generator parameterized to only generate "normal" samples from a latent space. Process 300 computes (315) an anomaly score. In various embodiments, anomaly scores are computed using a cyclic discriminator parameterized to distinguish between a true-reconstructed sample pair and a true-true sample pair. As the reconstructed sample will be normal whether an input sample is normal or anomalous, the cyclic discriminator in accordance with many embodiments of the invention can detect anomalies when the discriminator is able to distinguish the true-reconstructed sample as being different from each other. In certain embodiments, when an anomaly is detected (e.g., when the anomaly score exceeds a threshold), processes in accordance with some embodiments of the invention can provide an output, such as (but not limited to) a differential between the generated normal image and the input anomalous image, a notification, alert, and/or report.

While specific processes for anomaly detection are described above, any of a variety of processes can be utilized to detect anomalies as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Systems for Anomaly Detection

Anomaly Detection System

Figure 4:
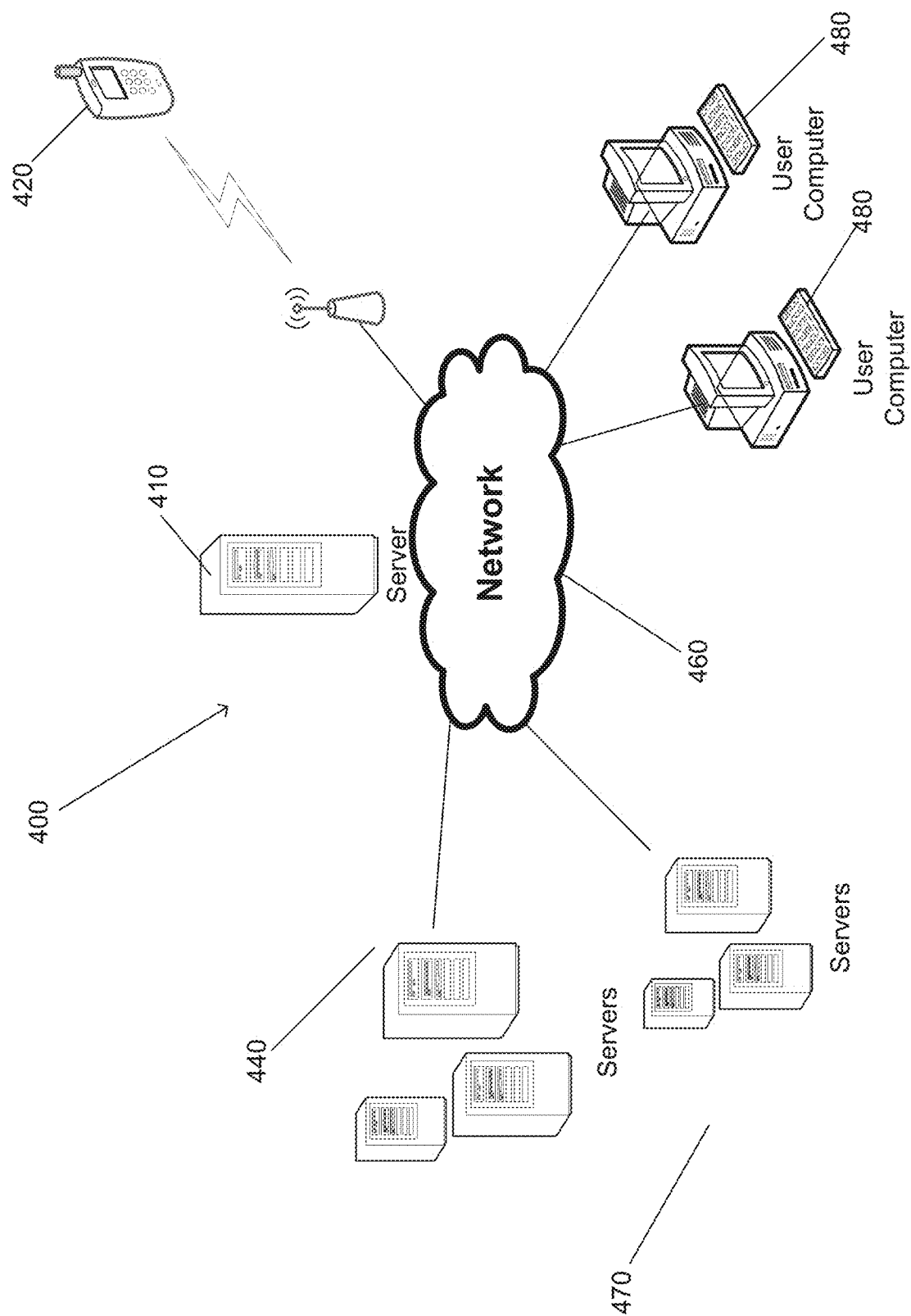
FIG. 4 illustrates an example of an anomaly detection system in accordance with an embodiment of the invention.

A system that provides a system that can be used for anomaly detection in accordance with some embodiments of the invention is shown in FIG. 4. Network 400 includes a communications network 460. The communications network 460 is a network such as the Internet that allows devices connected to the network 460 to communicate with other connected devices. Server systems 410, 440, and 470 are connected to the network 460. Each of the server systems 410, 440, and 470 is a group of one or more servers communicatively connected to one another via internal networks that execute processes that provide cloud services to users over the network 460. For purposes of this discussion, cloud services are one or more applications that are executed by one or more server systems to provide data and/or executable applications to devices over a network. The server systems 410, 440, and 470 are shown each having three servers in the internal network. However, the server systems 410, 440 and 470 may include any number of servers and any additional number of server systems may be connected to the network 460 to provide cloud services. In accordance with various embodiments of this invention, an anomaly detection system that uses systems and methods that can be used in anomaly detection in accordance with an embodiment of the invention may be provided by a process being executed on a single server system and/or a group of server systems communicating over network 460.

Users may use personal devices 480 and 420 that connect to the network 460 to perform processes for providing and/or interaction with an anomaly detection system in accordance with various embodiments of the invention. For example, samples can be gathered and/or analyzed for anomalies at personal devices. In the shown embodiment, the personal devices 480 are shown as desktop computers that are connected via a conventional "wired" connection to the network 460. However, the personal device 480 may be a desktop computer, a laptop computer, a smart television, an entertainment gaming console, or any other device that connects to the network 460 via a "wired" connection. The mobile device 420 connects to network 460 using a wireless connection. A wireless connection is a connection that uses Radio Frequency (RF) signals, Infrared signals, or any other form of wireless signaling to connect to the network 460. In FIG. 4, the mobile device 420 is a mobile telephone. However, mobile device 420 may be a mobile phone, Personal Digital Assistant (PDA), a tablet, a smartphone, or any other type of device that connects to network 460 via wireless connection without departing from this invention.

As can readily be appreciated the specific computing system used for anomaly detection is largely dependent upon the requirements of a given application and should not be considered as limited to any specific computing system(s) implementation. Computing systems and processes in accordance with a variety of embodiments of the invention are discussed further below.

Anomaly Detection Element

Figure 5:
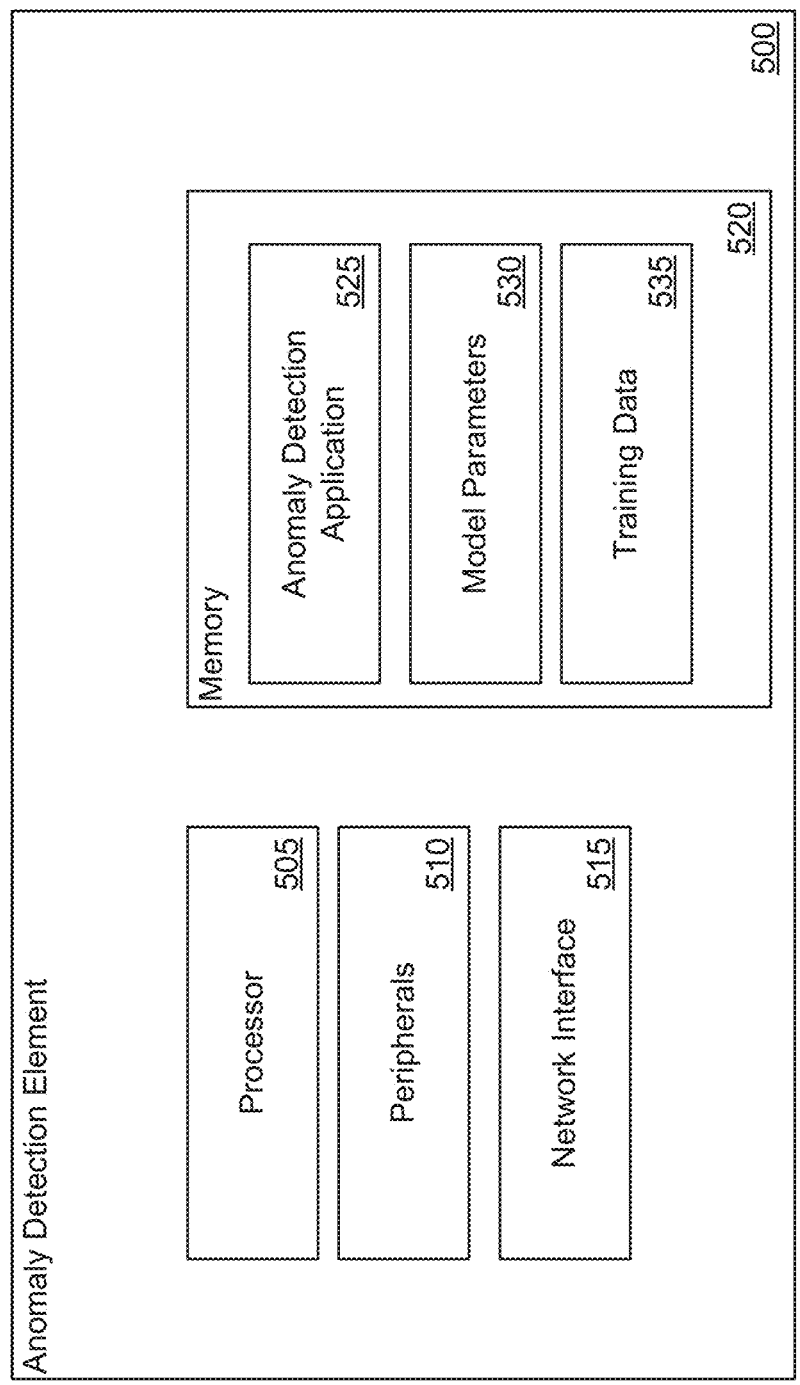
FIG. 5 illustrates an example of an anomaly detection element in accordance with an embodiment of the invention.

An example of a processing system in a device that executes instructions to perform processes that provide interaction with other devices connected to a network and/or for anomaly detection in accordance with various embodiments of the invention is shown in FIG. 5. Anomaly detection elements in accordance with many embodiments of the invention can include (but are not limited to) one or more of mobile devices, servers, cloud services, and/or other computing devices. Anomaly detection element 500 includes processor 505, peripherals 510, network interface 515, and memory 520 such as a non-transitory computer-readable medium.

One skilled in the art will recognize that a particular anomaly detection element may include other components that are omitted for brevity without departing from this invention. The processor 505 can include (but is not limited to) a processor, microprocessor, controller, or a combination of processors, microprocessor, and/or controllers that performs instructions stored in the memory 520 to manipulate data stored in the memory. Processor instructions can configure the processor 505 to perform processes in accordance with certain embodiments of the invention.

Peripherals 510 can include any of a variety of components for capturing data, such as (but not limited to) cameras, displays, and/or sensors. In a variety of embodiments, peripherals can be used to gather inputs and/or provide outputs. Network interface 515 allows anomaly detection element 500 to transmit and receive data over a network based upon the instructions performed by processor 505. Peripherals and/or network interfaces in accordance with many embodiments of the invention can be used to gather inputs that can be analyzed for anomalies and/or to provide outputs (e.g., reports, notifications, alerts, etc.) based on the detection of such anomalies.

Memory 520 includes an anomaly detection application 525, model parameters 530, and training data 535. Anomaly detection applications in accordance with several embodiments of the invention can be used to train (or parameterize) anomaly detection models using training data and/or to detect anomalies. In several embodiments, training data only includes "normal" samples. In many embodiments, anomaly detection applications can operate over a number of different processors and/or computing devices to perform processes in accordance with various embodiments of the invention.

Although a specific example of an anomaly detection element 500 is illustrated in FIG. 5, any of a variety of anomaly detection elements can be utilized to perform processes similar to those described herein as appropriate to the requirements of specific applications in accordance with embodiments of the invention.

Anomaly Detection Application

Figure 6:
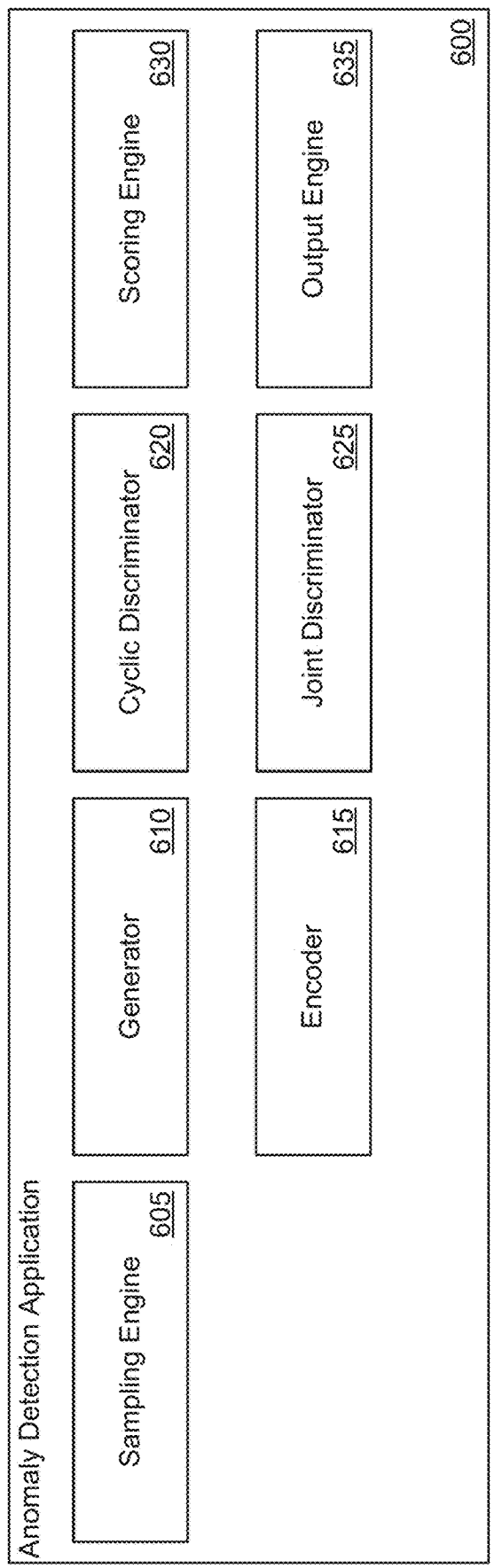
FIG. 6 illustrates an example of an anomaly detection application in accordance with an embodiment of the invention.

An example of an anomaly detection application for training anomaly detection models and/or detecting anomalies in accordance with an embodiment of the invention is illustrated in FIG. 6. Anomaly detection application 600 includes sampling engine 605, generator 610, encoder 615, cyclic discriminator 620, joint discriminator 625, scoring engine 630, and output engine 635.

In many embodiments, sampling engines can sample from a data distribution, an anomaly distribution, and a latent space. In a variety of embodiments, sampling engines can draw samples using a variety of methods such as (but not limited to) simple random sampling, clustered sampling, stratified sampling, and systematic sampling. In some embodiments, the drawn samples can include both data samples that represent elements of a data distribution and encoding samples that represent encodings of data samples. Data samples in accordance with various embodiments of the invention can be drawn from a data distribution (e.g., a true or "normal" distribution) and/or an anomaly distribution, and can include various types of data including (but not limited to) images, text, 3D meshes, etc. Anomaly distributions in accordance with some embodiments of the invention can include a surrogate anomaly distribution, such as (but not limited to) a Gaussian distribution and/or a uniform distribution. In various embodiments, drawing from an anomaly distribution can include drawing from a true anomaly distribution, e.g., drawing samples that are identified as anomalous.

Encoding samples in accordance with a variety of embodiments of the invention can be drawn a latent space, and can include (but are not limited to) points from the latent space that can represent feature vectors and/or other encodings of data samples. Latent spaces in accordance with a variety of embodiments of the invention can be initialized to random noise.

Generators in accordance with some embodiments of the invention can be trained (or parameterized) based on true samples, generated samples, and anomalous samples. In a variety of embodiments, generators can be used to generate synthetic outputs based on encoding samples of the latent space. In numerous embodiments, synthetic outputs can then be used to train discriminators to identify "normal" data samples. Training a generator in accordance with certain embodiments of the invention can include computing a loss using a cyclic discriminator and/or a joint discriminator and backpropagating the loss through the generator. In some embodiments, the loss is based on a cyclic discriminator's ability to distinguish between a true-reconstructed sample pair and a true-true sample pair. The loss in accordance with certain embodiments of the invention is based on a joint discriminator's ability to distinguish between sample-encoding pairs of true samples versus anomalous and/or generated samples. Training generators in accordance with many embodiments of the invention can allow a generator to produce samples within a "normal" distribution, regardless of the input encoding.

In some embodiments, encoders can be used to identify features within a latent space for an input sample (e.g., an image). In a number of embodiments, encoders are trained to generate encodings that allow a generator to faithfully reproduce (or reconstruct) a sample from its associated encoding. Encoders in accordance with numerous embodiments of the invention can include one or more encoding models, such as (but not limited to) convolutional neural networks (CNNs).

Cyclic discriminators in accordance with a number of embodiments of the invention can be used to train a generator and encoder to be inverse functions that can reliably reconstruct samples from an encoding of a sample. In several embodiments, cyclic discriminators can be used to distinguish between samples and reconstructed samples. Cyclic discriminators in accordance with a number of embodiments of the invention are trained to distinguish between a true-reconstructed sample pair and a true-true sample pair.

In certain embodiments, joint discriminators can be used to train generators and encoders to match the statistical distributions of sample encodings E(x) and their samples x, with latent samples z and their corresponding generated samples G(z) (i.e., (E(x),x) and (z,G(z)) match). Joint discriminators in accordance with a number of embodiments of the invention can distinguish between true sample-encoding pairs and anomalous and/or generated sample-encoding pairs. Joint discriminators in accordance with a number of embodiments of the invention are trained to distinguish between sample-encoding pairs of true samples versus anomalous and/or generated samples.

Scoring engines in accordance with various embodiments of the invention can be used to compute anomaly scores for a given sample. In many embodiments, scoring engines can generate an anomaly score based on a cyclic discriminator that takes a sample and its reconstruction as input. Scores in accordance with several embodiments of the invention can indicate a probability that a given sample is anomalous.

Output engines in accordance with several embodiments of the invention can provide a variety of outputs to a user, including (but not limited to) comparisons between a reconstructed normal image and an input anomalous image, alerts, notifications, and anomaly scores. In a variety of embodiments, output engines can provide an output when an anomaly score for a sample exceeds a threshold. In many embodiments, systems and methods can use a parameter that can used to tune the tolerance to anomalous features, that is how far a sample can be from the "normal" data before it becomes classified as anomalous.

Although specific systems and methods of anomaly detection are discussed above, many different anomaly detection methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for training a system for detecting anomalous samples, the method comprising:
   drawing data samples from a data distribution of true samples and an anomaly distribution, wherein the anomaly distribution is augmented using a set of real anomalous data;
   drawing a latent sample from a latent space;
   training a generator to generate data samples based on the drawn data samples and the latent sample, wherein the training comprises backpropagating a computed loss through the generator;
   training an encoder to generate encodings of data samples;
   training a cyclic discriminator to distinguish between true data samples and reconstructed samples, wherein a reconstructed sample is generated by the generator based on an encoding of a data sample, wherein the cyclic discriminator is adversarially trained to identify anomalous samples from a (x), wherein the computed loss is based on the cyclic discriminator's ability to distinguish between a true-reconstructed sample pair and a true-true sample pair;
   identifying a set of one or more true pairs, a set of one or more anomalous pairs, and a set of one or more generated pairs, wherein each true pair comprises a true sample and an encoding of the true sample, each anomalous pair comprises an anomalous sample and an encoding of the anomalous sample, and each generated pair comprises a sample generated from a latent sample and the latent sample; and
   training a joint discriminator to distinguish true pairs from anomalous and generated pairs, wherein the generator and encoder are trained based on the cyclic discriminator and the joint discriminator.

2. The method of claim 1, wherein the anomaly distribution is a surrogate anomaly distribution.

3. The method of claim 2, wherein the surrogate anomaly distribution is a Gaussian distribution.

4. The method of claim 1, wherein drawing a sample from the anomaly distribution comprises drawing samples from a known set of anomalous data samples.

5. The method of claim 1, wherein the latent space is a random noise distribution.

6. The method of claim 1, wherein the training the generator comprises:
   generating a data sample from the drawn latent sample;
   generating encodings of the true data sample and an anomalous data sample;
   computing a loss by:
      passing the true data sample and corresponding generated encoding through a discriminator;
      passing the anomalous data sample and corresponding generated encoding through the discriminator; and
      passing the generated data sample and the drawn latent sample through the discriminator; and
   backpropagating the computed loss through the generator.

7. The method of claim 1, further comprising:
   receiving a data sample;
   generating a reconstructed data sample from the received data sample using the generator; and
   computing an anomaly score for a sample pair using the joint discriminator, wherein the sample pair comprises the received data sample and the reconstructed data sample.

8. A method for detecting anomalous samples, the method comprising:
   receiving a data sample;
   generating a reconstructed data sample from the received data sample using a generator parameterized to generate data samples according to a true distribution, wherein the generator is trained to generate data samples based on drawn data samples from a data distribution of true samples and an anomaly distribution wherein the anomaly distribution is augmented using a set of real anomalous data, and latent samples from a latent space, wherein the training comprises backpropagating a computed loss through the generator; and
   computing an anomaly score for a sample pair comprising the received data sample and the reconstructed data sample, wherein computing the anomaly score comprises using a discriminator parameterized to determine a probability that the sample pair comprises a pair of samples from the true distribution, wherein the discriminator is adversarially trained to identify anomalous samples from a(x), wherein the anomaly score is based on the discriminator's ability to distinguish between a true-reconstructed sample pair and a true-true sample pair.

9. A system for training for detecting anomalous samples, the system comprising:
at least one processor;
a memory; and
at least one non-transitory computer-readable media comprising program instructions that are executable by the at least one processor such that the system is configured to perform training for anomaly detection by:
drawing data samples from a data distribution of true samples and an anomaly distribution, wherein the anomaly distribution is augmented using a set of real anomalous data;
drawing a latent sample from a latent space;
training a generator to generate data samples based on the drawn data samples and the latent sample, wherein the training comprises backpropagating a computed loss through the generator;
training an encoder to generate encodings of data samples;
training a cyclic discriminator to distinguish between true data samples and reconstructed samples, wherein a reconstructed sample is generated by the generator based on an encoding of a data sample, wherein the cyclic discriminator is adversarially trained to identify anomalous samples from a(x), wherein the computed loss is based on the cyclic discriminator's ability to distinguish between a true-reconstructed sample pair and a true-true sample pair;
identifying a set of one or more true pairs, a set of one or more anomalous pairs, and a set of one or more generated pairs, wherein each true pair comprises a true sample and an encoding of the true sample, each anomalous pair comprises an anomalous sample and an encoding of the anomalous sample, and each generated pair comprises a sample generated from a latent sample and the latent sample; and
training a joint discriminator to distinguish true pairs from anomalous and generated pairs, wherein the generator and encoder are trained based on the cyclic discriminator and the joint discriminator.

10. The system of claim 9, wherein the anomaly distribution is a surrogate anomaly distribution.

11. The system of claim 10, wherein the surrogate anomaly distribution is a Gaussian distribution.

12. The system of claim 9, wherein drawing a sample from the anomaly distribution comprises drawing samples from a known set of anomalous data samples.

13. The system of claim 9, wherein the latent space is a random noise distribution.

14. The system of claim 9, wherein training the generator comprises:

generating a data sample from the drawn latent sample;
generating encodings of the true data sample and an anomalous data sample;
computing a loss by:
passing the true data sample and the corresponding generated encoding through the joint discriminator;
passing the anomalous data sample and the corresponding generated encoding through the joint discriminator; and
passing the generated data sample and the drawn latent sample through the joint discriminator; and
backpropagating the computed loss through the generator.

15. The system of claim 9, wherein the system further comprises:
receiving a data sample;
generating a reconstructed data sample from the received data sample using the generator; and
computing an anomaly score for a sample pair using the joint discriminator, wherein the sample pair comprises the received data sample and the reconstructed data sample.

16. A system for detecting anomalous samples, the system comprising:
at least one processor;
a memory; and
at least one non-transitory computer-readable media comprising program instructions that are executable by the at least one processor such that the system is configured to perform anomaly detection by:
receiving a data sample;
generating a reconstructed data sample from the received data sample using a generator parameterized to generate data samples according to a true distribution, wherein the generator is trained to generate data samples based on drawn data samples from a data distribution of true samples and an anomaly distribution wherein the anomaly distribution is augmented using a set of real anomalous data, and latent samples from a latent space, wherein the training comprises backpropagating a computed loss through the generator; and
computing an anomaly score for a sample pair comprising the received data sample and the reconstructed data sample, wherein computing the anomaly score comprises using a discriminator parameterized to determine a probability that the sample pair comprises a pair of samples from the true distribution, wherein the discriminator is adversarially trained to identify anomalous samples from a(x), wherein the anomaly score is based on the discriminator's ability to distinguish between a true-reconstructed sample pair and a true-true sample pair.

* * * * *